(12) United States Patent
Dan

(10) Patent No.: US 8,625,132 B2
(45) Date of Patent: Jan. 7, 2014

(54) IMAGE FORMING DEVICE AND REPLACEMENT

(75) Inventor: Kenichi Dan, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1023 days.

(21) Appl. No.: 12/652,369

(22) Filed: Jan. 5, 2010

(65) Prior Publication Data

US 2010/0188693 A1    Jul. 29, 2010

(30) Foreign Application Priority Data

Jan. 26, 2009  (JP) ................................. 2009-014663

(51) Int. Cl.
*G06F 3/12*     (2006.01)
*G06F 13/42*    (2006.01)

(52) U.S. Cl.
USPC ......................................... 358/1.15; 340/10.1

(58) Field of Classification Search
None
See application file for complete search history.

(56) References Cited

U.S. PATENT DOCUMENTS

| | | | |
|---|---|---|---|
| 7,333,786 B2* | 2/2008 | Kikuchi et al. | 455/130 |
| 7,433,610 B2* | 10/2008 | Oyama | 399/25 |
| 8,152,392 B2* | 4/2012 | Tanaka | 400/613 |
| 2001/0029857 A1* | 10/2001 | Heredia et al. | 101/288 |
| 2002/0188504 A1* | 12/2002 | Whale | 705/14 |
| 2006/0145863 A1* | 7/2006 | Martin et al. | 340/572.8 |
| 2006/0219770 A1* | 10/2006 | Oyama | 235/375 |
| 2006/0250252 A1* | 11/2006 | Nagai et al. | 340/572.7 |
| 2007/0084548 A1* | 4/2007 | Tanaka | 156/238 |
| 2007/0139686 A1* | 6/2007 | Nishimi | 358/1.13 |
| 2007/0262864 A1* | 11/2007 | Yasui et al. | 340/572.1 |
| 2008/0093027 A1* | 4/2008 | Niwa et al. | 156/387 |

FOREIGN PATENT DOCUMENTS

| | | |
|---|---|---|
| JP | 2000-338778 A | 12/2000 |
| JP | 2003-208060 A | 7/2003 |
| JP | 2004-258186 | 9/2004 |
| JP | 2009-015018 A | 1/2009 |

OTHER PUBLICATIONS

JP Office Action dtd Dec. 21, 2012, JP Appln. 2009-014663, English Translation.
Notification of Reasons for Rejection dispatched May 17, 2011 in Japanese Application No. 2009-014663 and English translation thereof.

* cited by examiner

*Primary Examiner* — Vincent Rudolph
*Assistant Examiner* — Marcus T Riley
(74) *Attorney, Agent, or Firm* — Banner & Witcoff, Ltd.

(57) ABSTRACT

An image forming device to which a replacement is detachably attachable, where in the replacement includes: a non-contact type IC tag that stores data concerning the replacement and is able to transmit the data through a radio signal; a holding member that holds the IC tag; and a shielding member formed to alter a state of the IC tag between an exposed state and a shielded state by changing relatively a positional relationship with the holding member, and the image forming device includes: the detection unit to detect the IC tag; a driving unit to drive at least one of the holding member and the shielding member to change the state of the IC tag; and a controller that identifies the non-contact type IC tag as that in the replacement being attached to the image forming device in response to a fact that the IC tag is intermittently detected.

16 Claims, 11 Drawing Sheets

FIG.2A
ARRANGEMENT OF NON-CONTACT TYPE IC TAG, HOLDING MEMBER AND SHIELDING MEMBER
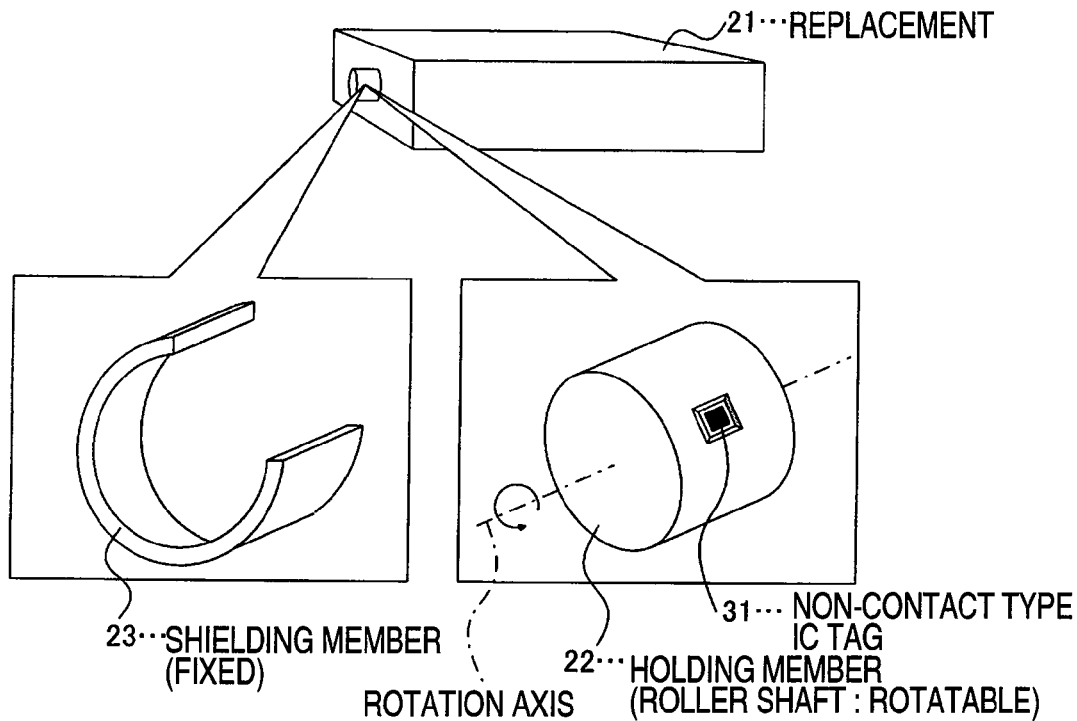
FIG.2B
EXPOSED STATE (READABLE)
FIG.2C
SHIELDED STATE (NOT READABLE)
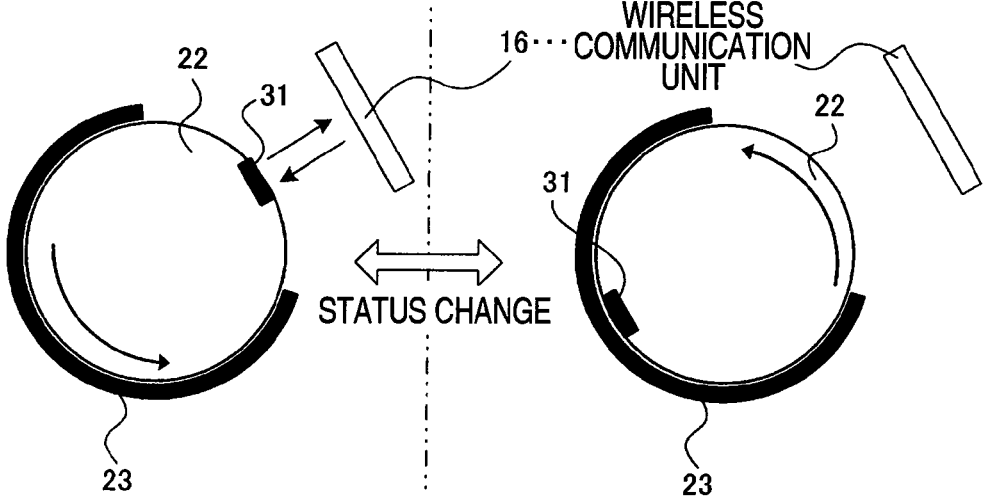

ARRANGEMENT OF NON-CONTACT TYPE IC TAG, HOLDING MEMBER AND SHIELDING MEMBER

21···REPLACEMENT
31···NON-CONTACT TYPE IC TAG
22···HOLDING MEMBER (FIXED)
23···SHIELDING MEMBER (ROTATABLE IN COOPERATION WITH ROLLER SHAFT)
ROTATION AXIS

EXPOSED STATE(READABLE)

SHIELDED STATE(NOT READABLE)

16···WIRELESS COMMUNICATION UNIT

STATUS CHANGE

ARRANGEMENT OF NON-CONTACT TYPE IC TAG, HOLDING MEMBER AND SHIELDING MEMBER

EXPOSED STATE (READABLE)

SHIELDED STATE (NOT READABLE)

EXAMPLE OF SHIELDING MEMBER HAVING A PLURALITY OF DETECTION WINDOWS

DETECTION PATTERN OF NON-CONTACT TYPE IC TAG WHEN A PLURALITY OF DETECTION WINDOWS ARE FORMED

IMAGE FORMING DEVICE AND REPLACEMENT

CROSS-REFERENCE TO RELATED APPLICATION

This application claims priority under 35 U.S.C. §119 from Japanese Patent Application No. 2009-014663, filed on Jan. 26, 2009. The entire subject matter of the application is incorporated herein by reference.

BACKGROUND

1. Technical Field

Aspects of the present invention relate to an image forming device to which a replacement having a non-contact type IC tag transmitting and receiving a radio signal conveying information concerning the replacement can be detachably attachable.

2. Related Art

Image forming devices configured to be able to manage replacements to be attached thereto by performing wireless communication with non-contact type IC tags held on the replacements have been widely used. Regarding such an image forming device, in order to prevent erroneously performing reading/writing information with respect to a non-contact type IC tag of a replacement which is not attached to the image forming device (e.g., a non-contact type IC tag placed outside the image forming device), the image forming device is required to distinguish a replacement attached to the image forming device from a replacement which is not attached to the image forming device.

SUMMARY

It is possible to distinguish a replacement attached to the image forming device from a replacement not attached to the image forming device by configuring the image forming device to have attachment terminals which are electrically connected to detection contacts of the replacement in the state where the replacement is attached to the image forming device. However, even if such a configuration is adopted, a possibility remains that a contact failure occurs between the attachment terminals of the image forming device and the detection contacts of the replacement Aspects of the present invention are advantageous in that at least one of an image forming device and a replacement configured to reliably identify the replacement attached to the image forming device is provided.

According to an aspect of the invention, there is provided an image forming device to which a replacement is detachably attachable. The replacement comprises: a non-contact type IC tag that stores data concerning the replacement and is able to transmit the data through a radio signal; a holding member that holds the non-contact type IC tag; and a shielding member formed to alter a state of the non-contact type IC tag between an exposed state where the non-contact type IC tag is exposed and a detection unit of the image forming device is able to detect the non-contact type IC tag, and a shielded state where the detection unit is not able to detect the non-contact type IC tag, by changing relatively a positional relationship with the holding member. The image forming device comprises: the detection unit configured to detect the non-contact types IC tag by receiving the radio signal transmitted from the non-contact type IC tag; a driving unit configured to drive at least one of the holding member and the shielding member to change the state of the non-contact type IC tag between the exposed state and the shielded state; and a controller that identifies the non-contact type IC tag detected by the detection unit as that provided in the replacement being attached to the image forming device in response to a fact that the non-contact type IC tag is intermittently detected by the detection unit while the driving unit is activated.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 2A illustrates a first example of an arrangement of a non-contact type IC tag, a holding member and a shielding member.

FIG. 2B illustrates an exposed state of the non-contact type IC tag when viewed from a side of an edge surface of the holding member.

FIG. 2C illustrates a shielded state of the non-contact type IC tag when viewed from a side of an edge surface of the holding member.

DETAILED DESCRIPTION

Hereafter, an embodiment according to the invention will be described with reference to the accompanying drawings.

Figure 1:
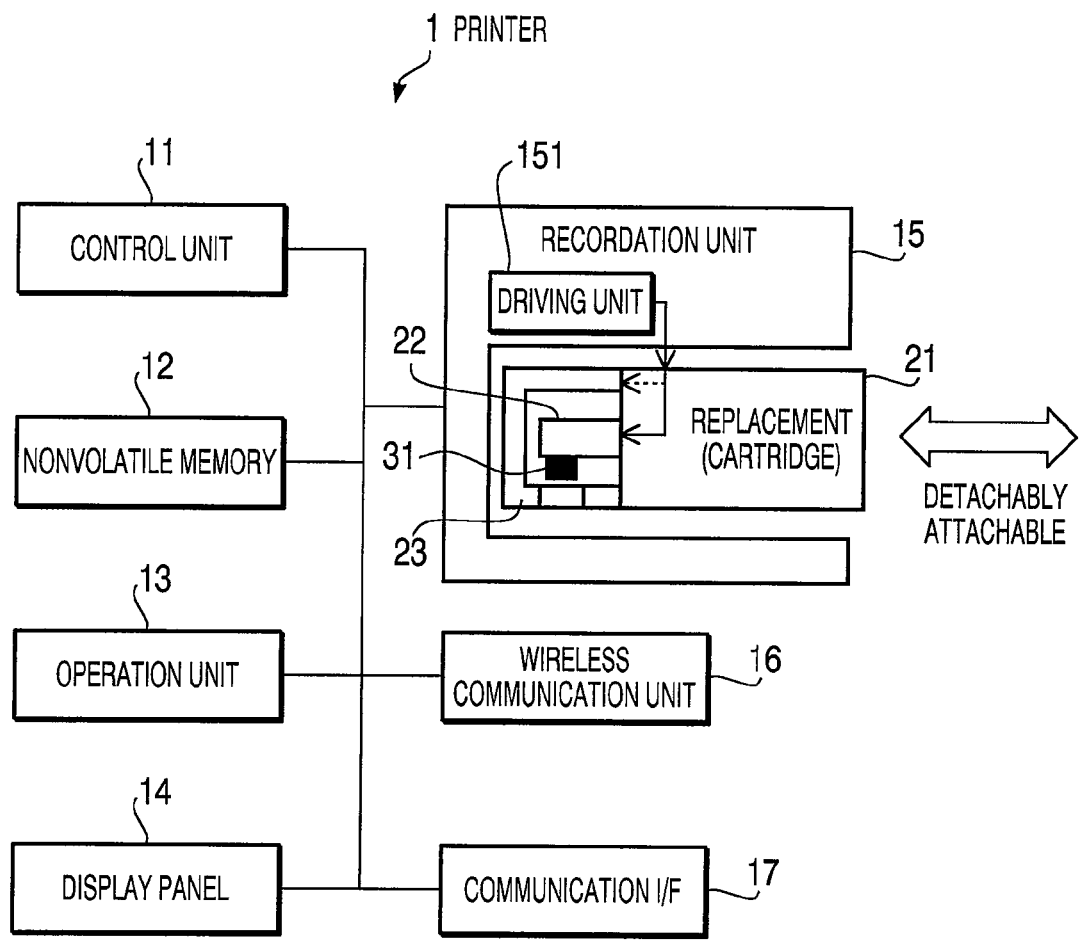
FIG. 1 is a block diagram illustrating a general configuration of a printer according to an embodiment.

As shown in FIG. 1, a printer 1 according to an embodiment includes a control unit 11, a non-volatile memory 12, an operation unit 13, a display panel 14, a recordation unit 15, a wireless communication unit 16, and a communication interface 17 used to communicate with external devices, such as a device on a network or a device locally connected thereto.

The control unit 11 is implemented, for example, by a microcomputer chip in which a CPU, a RAM and a ROM are embedded. The control unit 11 totally controls the printer 1. The control unit 11 executes a print process for printing an image on a recording medium based on print data received, for example, from an information processing device, via the communication interface 17. The non-volatile memory 12 stores programs and various types of data for achieving the functions of the printer 1. The operation unit 13 includes a plurality of keys to be operated by a user. The display panel 14 is, for example, a liquid crystal panel on which various types of information is displayed.

The recordation unit 15 forms an image on a recording medium, such as a sheet of paper. The recordation unit 15 is configured such that image formation units can be detachably attachable to the recordation unit 15. The image formation units (i.e., replacements) detachably attachable to the recordation unit 15 include, for example, a paper supply cartridge which accommodates sheets of paper, a drum cartridge which transfers developer (e.g., toner) to a sheet of paper, and a developer cartridge which accommodates developer (e.g., toner). It should be noted that although in FIG. 1 only one replacement 21 (which is detachably attachable to the recordation unit 15) is illustrated, practically more than one cartridge type replacement can be detachably attachable to the recordation unit 15.

If the replacement 21 to be attached to the recordation unit 15 is the paper supply cartridge, the replacement 21 has a paper supply roller. If the replacement 21 is the drum cartridge, the replacement 21 has a photosensitive drum or a transfer roller. If the replacement 21 is the developer cartridge, the replacement 21 has a developer supply roller. That is, each type of replacement has a rotational member for achieving the function of each replacement. Accordingly, the recordation unit 15 has a driving unit 151 which rotates each rotational member of the replacement 21 with a motor driven by an on/off signal output by the control unit 11. That is, in the state where the replacement 21 is attached to the recordation unit 15, the driving force of the driving unit 151 of the recordation unit 15 is transmitted to the rotational member of the replacement 21 (see arrows in FIG. 1).

On the other hand, the replacement 21 is provided with a non-contact type IC tag (RFID tag) 31, a holding member 22 which holds the non-contact type IC tag 31, a shielding member 23 which alters a state of the non-contact type IC tag 31 between an exposed state where the non-contact type IC tag 31 is exposed to be read by the wireless communication unit 16 and a shielded state where the non-contact type IC tag 31 is shielded by the shielding member 23 not to be read by the wireless communication unit 16.

The non-contact type IC tag 31 stores identification information (ID) and specifications of the replacement 21, and is able to transmit such information stored therein through wireless communication with the wireless communication unit 16. Furthermore, the non-contact type IC tag 31 is able to stored information received from the wireless communication unit 16 of the printer 1.

One of the shielding member 23 and the holding member 22 holding the non-contact type IC tag 31 is formed integrally with a rotation shaft of each roller of the replacement 21 or is configured to be rotatable in conjunction with the rotation shaft of the replacement 21. In this configuration, when the roller of the replacement 21 is rotated by the driving unit 151, a positional relationship between the holding member 22 and the shielding member 23 changes in response to rotation of the roller, and therefore the state of the non-contact type IC tag 31 alternately alters between the exposed state and the shielded state. Details (e.g., motions and shapes) of the holding member 22 and the shielding member 23 will be explained later.

The wireless communication unit 16 is configured as an IC reader and writer which, under control of the control unit 11, reads data from and writes data to the non-contact type IC tag 31 provided in the replacement 21 attached to the recordation unit 15.

As described in detail below, the printer 1 is configured such that based on the ID and the specifications read from the non-contact type IC tag 31 provided in the replacement 21 attached to the printer 1, the printer 1 manages the replacement 21. When a plurality of types of replacements are attached to the printer 1, the printer 1 identifies each replacement by detecting ID of each replacement.

It is required to prevent erroneously detecting a non-contact type IC tag of a replacement which is placed within a wireless communication range but is not attached to the printer 1, and thereby erroneously judging that the replacement including such a non-contact type IC is attached to the printer 1. For this reason, the printer 1 according to the embodiment is configured to be able to reliably distinguish a replacement attached to the printer 1 from a replacement not attached to the printer 1 as described below.

Hereafter, the holding member 22 and the shielding member 23 are explained in detail by providing four types of examples ($1^{st}$ to $4^{th}$ Examples) of the holding member 22 and the shielding member 23.

$1^{st}$ Example

In the $1^{st}$ example, the holding member 22 is configured to rotate, and the shielding member 23 is fixed (see FIGS. 2A to 2C). As shown in FIG. 2A, on a side surface of the replacement 21, a roller shaft is protruded, and a rotatable holding member (holding member 22) is formed by an end portion of the roller shaft. On an outer circumferential surface of a cylindrical shape of the holding member 22, the non-contact type IC tag 31 is held. The holding member 22 rotates about a rotation axis shown in FIG. 2A in accordance with rotation of the roller of the replacement 21. Therefore, the non-contact type IC tag 31 held on the outer circumferential surface of the holding member 22 rotates about the rotation axis with rotation of the holding member 22.

The holding member 22 is made of material (e.g., metal) which shields a radio wave transmitted and received by the non-contact type IC tag 31. Therefore, the non-contact type IC tag 31 has such directivity that the non-contact type IC tag 31 is able to communicate only on the front side of the non-contact type IC tag 31.

The shielding member 23 has a cylindrical shape having an inner diameter which is slightly larger than an outer diameter of the cylindrical shape of the holding member 22. Further, the shielding member 23 is formed such that a part of the cylindrical shape is removed along an axis of the cylindrical shape. That is, the shielding member 23 has a cross sectional shape having a form of a letter "C". The shielding member 23 is fixed to a casing of the replacement 21 such that a center axis of the cylindrical shape of the shielding member 23 coincides with the rotation axis of the holding member 22, and that a cylindrical inner surface of the shielding member 23 surrounds an outer circumferential surface of the holding member 22.

The shielding member 23 is made of material (e.g., metal) which shields a radio wave transmitted and received by the non-contact type IC tag 31. Therefore, by covering the front side of the non-contact type IC tag 31 held on the holding member 22 with a part of the shielding member 23 other than the removed part, it is possible to move the wireless condition to a state where the wireless communication unit 16 is unable to detect the non-contact type IC tag 31.

In the above described configuration regarding the holding member 22 and the shielding member 23, when the holding member 22 (provided to be rotatable) is rotated to move the non-contact type IC tag 31 relative to the shielding member 23, the positional relationship of the holding member 22 and the shielding member 23 repeatedly alters between the state where the non-contact type IC tag 31 is covered by the shielding member 23 and the state where the non-contact type IC tag 31 is exposed through the removed part of the shielding member 23.

As shown in FIG. 2B, when the front side of the non-contact type IC tag 31 is situated at the removed part of the shielding member 23, the non-contact type IC tag 31 is in an exposed state where the wireless communication unit 16 of the printer 1 is able to detect and read the non-contact type IC tag 31. On the other hand, as shown in FIG. 2C, when the non-contact type IC tag 31 is covered by the shielding member 23, the non-contact type IC tag 31 is in a shielded state where the wireless communication 16 of the printer 1 is unable to detect and read the non-contact type IC tag 31 because in this case a radio wave is shielded by the shielding member 23 and the holding member 22.

Figure 3:
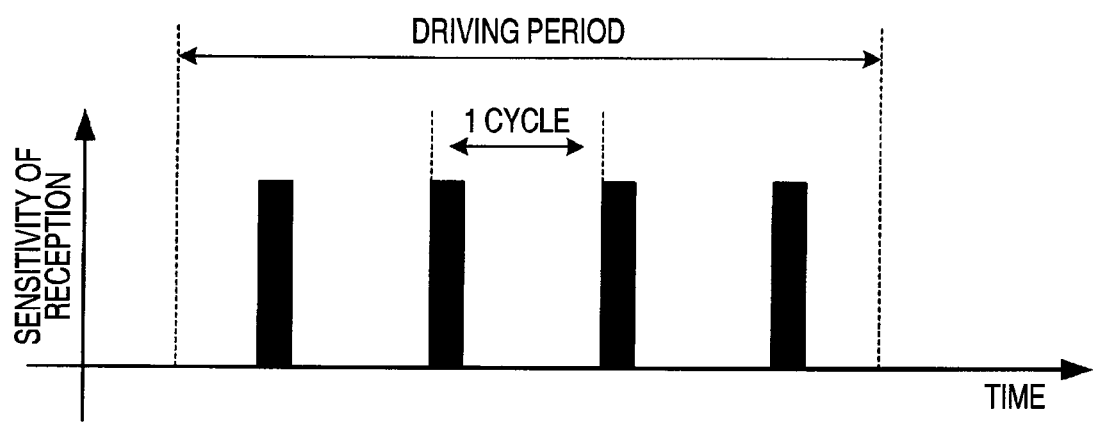
FIG. 3 is a graph illustrating an example of a detection pattern of the non-contact type IC tag.

In the above described configuration, by rotating the holding member 22 at a constant speed by the driving unit 151, a detection pattern of a radio signal of the non-contact type IC tag 31 by the wireless communication unit 16 becomes a pattern shown in FIG. 3. As shown in FIG. 3, during a time period where the driving unit 151 is activated, the radio wave of the non-contact type IC tag 31 is detected each time the non-contact type IC tag 31 makes one rotation together with the holding member 22. By continuing rotations of the holding member 22, the detection pattern shown in FIG. 3 where a short time of detection appears repeatedly is obtained.

2$^{nd}$ Example

Figure 4A:
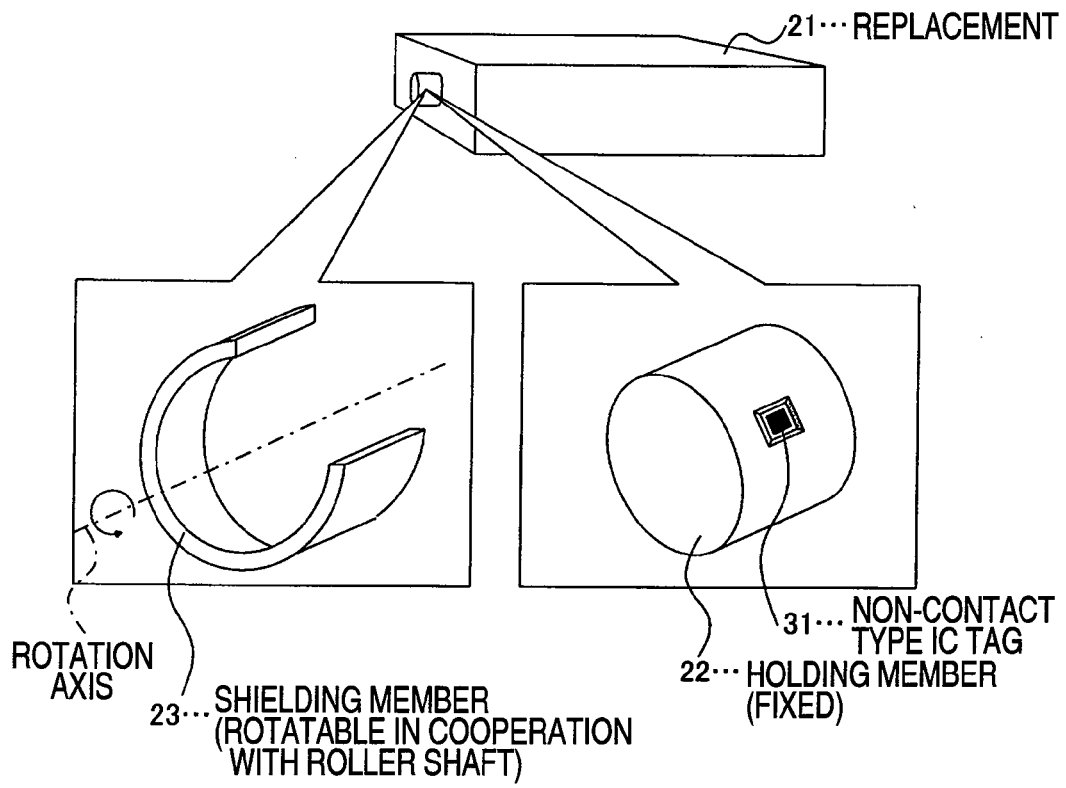
FIG. 4A illustrates a second example of an arrangement of the non-contact type IC tag, the holding member and the shielding member.
Figure 4B:
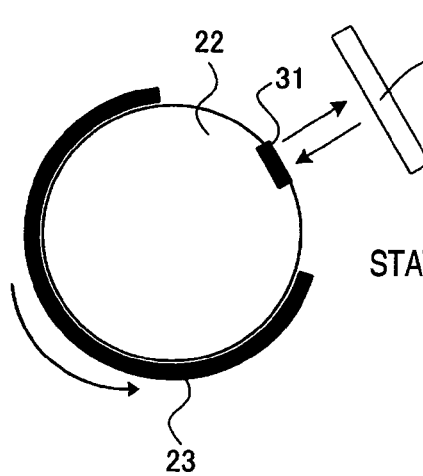
FIG. 4B illustrates an exposed state of the non-contact type IC tag when viewed from a side of an edge surface of the holding member.
Figure 4C:
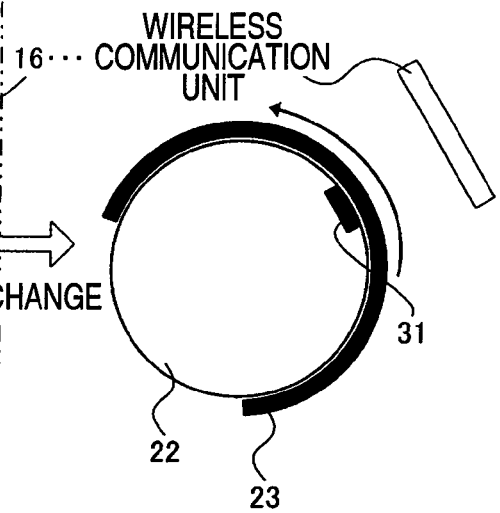
FIG. 4C illustrates a shielded state of the non-contact type IC tag when viewed from a side of an edge surface of the holding member.

In the 2$^{nd}$ example, the holding member 22 is fixed, and the shielding member 23 is rotatable (see FIGS. 4A to 4C).

As shown in FIG. 4A, on a side surface of the replacement 21, a roller shaft is protruded, and a rotatable shielding member (the shielding member 23) is formed by an end portion of the roller shaft. The shielding member 23 has a cylindrical shape having an inner diameter which is slightly larger than an outer diameter of a cylindrical shape of the holding member 22. Further, the shielding member 23 is formed such that a part of a cylindrical shape is removed along an axis of the cylindrical shape. That is, the shielding member 23 has a cross sectional shape having a form of a letter "C".

Further, the shielding member 23 is located such that an inner circumferential surface thereof surrounds the circumferential surface of the cylindrical holding member 22. The shielding member 23 is provided to rotate about a rotation axis shown in FIG. 4A in accordance with rotation of the roller of the replacement 21. That is, the shielding member 23 rotates around the holding member 22. The shielding member 23 is made of material (e.g. metal) which is able to shield a radio wave transmitted and received by the non-contact type IC tag 31. Therefore, by covering the front side of the non-contact type IC tag 31 held on the holding member 22 with a part of the shielding member 23 other than the removed part, it is possible to move the wireless condition to a state where the wireless communication unit 16 is unable to detect the non-contact type IC tag 31.

On the other hand, the holding member 22 holds the non-contact type IC tag 31 on the outer circumferential surface of the cylindrical shape thereof. The holding member 22 is positioned such that the center axis of the cylindrical shape thereof coincides with the rotation axis of the shielding member 23, and further the holding member 22 is fixed to a casing of the replacement 21 in a state where the outer circumferential surface thereof is surrounded by the shielding member 23. The holding member 22 is made of material (e.g., metal) which is able to shield a radio wave transmitted and received by the non-contact type IC tag 31. Therefore, the non-contact type IC tag 31 has such directivity that the non-contact type IC tag 31 is able to communicate only on the front side of the non-contact type IC tag 31.

In the above described configuration regarding the holding member 22 and the shielding member 23, when the shielding member 23 (provided to be rotatable) is rotated to move relative to the non-contact type IC tag 31, the positional relationship of the holding member 22 and the shielding member 23 repeatedly alters between the state where the non-contact type IC tag 31 is covered by the shielding member 23 and the state where the non-contact type IC tag 31 is exposed through the removed part of the shielding member 23.

As shown in FIG. 4B, when the removed part of the shielding member 23 is moved to the position at which the non-contact type IC tag 31 is held and thereby the non-contact type IC tag 31 is brought to the exposed state where the front side of the non-contact type IC tag 31 is exposed through the removed part of the shielding member 23, the wireless communication unit 16 of the printer 1 becomes able to detect and read the non-contact type IC tag 31.

On the other hand, as shown in FIG. 4C, when the non-contact type IC tag 31 is covered by the shielding member 23, the non-contact type IC tag 31 is brought to the shielded state where the wireless communication 16 of the printer 1 is unable to detect and read the non-contact type IC tag 31 because in this case a radio wave is shielded by the shielding member 23 and the holding member 22.

In the above described configuration, by rotating the shielding member 23 at a constant speed by the driving unit 151, a detection pattern of a radio signal of the non-contact type IC tag 31 by the wireless communication unit 16 becomes a pattern shown in FIG. 3. As shown in FIG. 3, during a time period where the driving unit 151 is activated, the radio wave of the non-contact type IC tag 31 is detected each time the non-contact type IC tag 31 makes one rotation together with the shielding member 23. By continuing rotations of the shielding member 23, the detection pattern shown in FIG. 3 where short time detection appears repeatedly is obtained.

3$^{rd}$ Example

In the following, the 3$^{rd}$ example of the configurations of the holding member 22 and the shielding member 23 is explained. In the $3^{nd}$ example which is different from the first and second examples, the holding member 22 is rotatable and the shielding member 23 is fixed, and in this configuration the state of the non-contact type IC tag 31 alters between the exposed state and the shielded state (see FIGS. 5A to 5C).

Figure 5A:
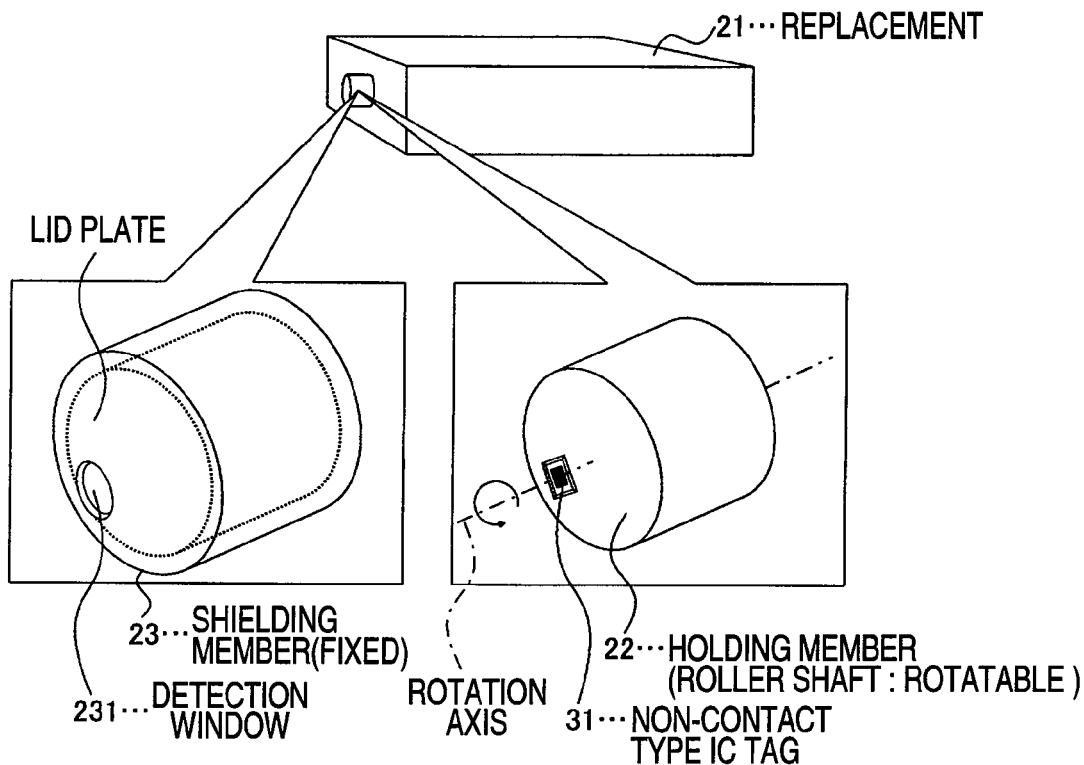
FIG. 5A illustrates a third example of an arrangement of the non-contact type IC tag, the holding member and the shielding member.

As shown in FIG. 5A, on a side surface of the replacement 21, a roller shaft is protruded, and a rotatable holding member (holding member 22) is formed by an end portion of the roller shaft. The holding member 22 hold the non-contact type IC tag 31 on an end face of a cylindrical part thereof, and rotates about a rotation axis shown in FIG. 5A with rotation of a roller in the replacement 21.

More specifically, the non-contact type IC tag 31 is located on the end face of the cylindrical part at a position shifted from the rotation axis toward the periphery side, so that the non-contact type IC 31 rotates about the rotation axis in accordance with rotation of the holding member 22. The holding member 22 is made of material (e.g., metal) which is able to shield a radio wave transmitted and received by the non-contact type IC tag 31. Therefore, the non-contact type IC tag 31 held on the holding member 22 has such directivity that the non-contact type IC tag 31 is able to communicate only on the front side of the non-contact type IC tag 31.

On the other hand, the shielding member 23 has a cylindrical shape whose inner diameter is slightly larger than the outer diameter of the holding member 22. The shielding member 23 is a lid-like member configured such that one of open ends thereof is covered by a lid plate. The shielding member 23 is positioned such that the center axis of the cylindrical shape thereof coincides with the rotation axis of the holding member 22, and is fixed to a casing of the replacement 21 such that the end face and the outer circumferential surface of the holding member 22 are covered by the cylindrical inner surface and the inner surface of the lid plate of the shielding member 23.

Furthermore, a hole (a detection window 231) is formed in the lid plate of the shielding member 23. More specifically, the detection window 231 is located at a position along a track of rotational movement of the non-contact IC tag 31 about the rotation axis, and is formed to have a size enabling the entire non-contact type IC 31 to be exposed through the detection window 231.

The shielding member 23 is made of material (e.g., metal) which is able to shield a radio wave transmitted and received by the non-contact type IC tag 31. By covering the non-contact type IC tag 31 held on the holding member 22 with a part of the shielding member 23 other than a part of the detection window 231, the shielding member 23 changes the wireless condition to a state where the wireless communication unit 16 is unable to detect the non-contact type IC tag 31.

In the above described configuration regarding the holding member 22 and the shielding member 23, when the holding member 22 (provided to be rotatable) is rotated to move the non-contact type IC tag 31 relative to the shielding member 23, the positional relationship of the holding member 22 and the shielding member 23 repeatedly alters between the state where the non-contact type IC tag 31 is covered by the shielding member 23 and the state where the non-contact type IC tag 31 is exposed through the detection window 231.

As shown in FIG. 5A, when the holding member 22 rotates about the center axis and thereby the non-contact type IC tag 31 is moved to the position where the non-contact type IC tag 31 is exposed through the detection window 231 of the shielding member 23, the non-contact type IC tag 31 is brought to the exposed state where the wireless communication unit 16 of the printer 1 is able to detect and read the non-contact type IC tag 31.

Figure 5B:
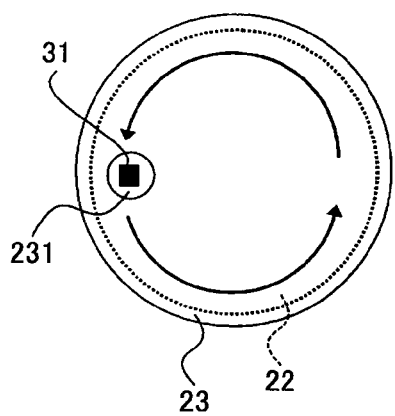
FIG. 5B illustrates an exposed state of the non-contact type IC tag when viewed from a side of an edge surface of the holding member.
Figure 5C:
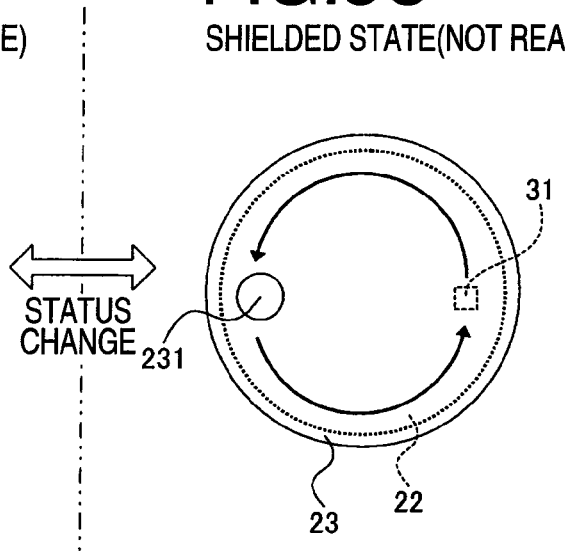
FIG. 5C illustrates a shielded state of the non-contact type IC tag when viewed from a side of an edge surface of the holding member.

On the other hand, as shown in FIG. 5B, when the holding member 22 rotates about the rotation axis and thereby the non-contact type IC tag 31 is moved to the state where the non-contact type IC tag 31 is covered by the shielding member 23, the non-contact type IC tag 31 is brought to the shielded state where the wireless communication 16 of the printer 1 is unable to detect and read the non-contact type IC tag 31 because in this case a radio wave is shielded by the shielding member 23 and the holding member 22.

In the above described configuration of the replacement 21, by rotating the holding member 22 at a constant speed by the driving unit 151, a detection pattern of a radio signal of the non-contact type IC tag 31 by the wireless communication unit 16 becomes a pattern shown in FIG. 3. As shown in FIG. 3, during a time period where the driving unit 151 is activated, the radio wave of the non-contact type IC tag 31 is detected each time the non-contact type IC tag 31 makes one rotation together with the shielding member 23. By continuing rotations of the shielding member 23, the detection pattern shown in FIG. 3 where short time detection appears repeatedly is obtained.

$4^{th}$ Example

In the following, the $4^{th}$ example of the configurations of the holding member 22 and the shielding member 23 is explained. The $4^{th}$ example is a variation of the $3^{rd}$ example. In the $4^{th}$ example, a plurality of detection windows 231 are formed in the lid plate of the shielding member 23 (see FIG. 6A).

Figure 6A:
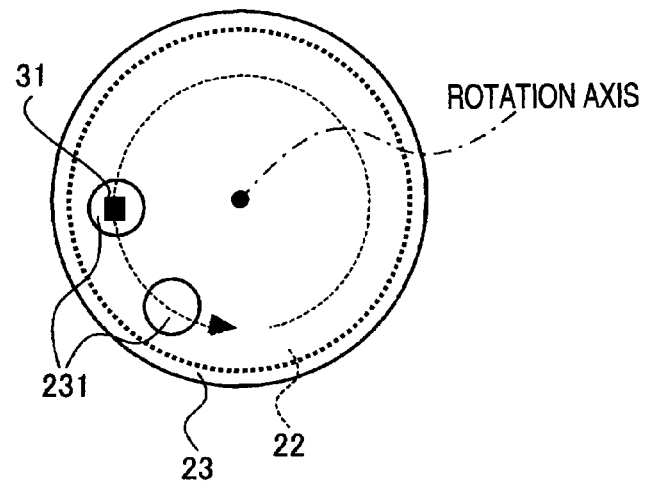
FIG. 6A illustrates a fourth example of an arrangement of the non-contact type IC tag, the holding member and the shielding member.

As shown in FIG. 6A, two holes (detection widows 231) are formed in the lid plate of the shielding member 23 which covers the rotatable holding member 22. The two detection windows 231 are formed along a track of rotation of the non-contact type IC tag 31.

Figure 6B:
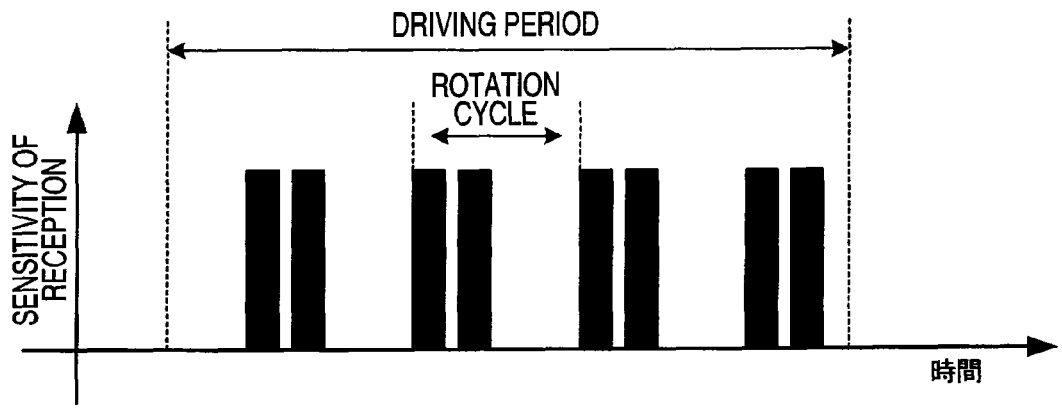
FIG. 6B is a graph illustrating a detection pattern of the non-contact type IC tag in the arrangement shown in FIG. 6A.

When the holding member 22 is rotated at a constant speed by the driving unit 151 in this configuration of the replacement 21, a detection pattern of a radio signal of the non-contact type IC tag 31 by the wireless communication unit 16 becomes a pattern shown in FIG. 6B. As shown in FIG. 6B, during a time period where the driving unit 151 is activated, the radio wave of the non-contact type IC tag 31 is detected two times for one rotation of the holding member 22 and the non-contact type IC tag 31. By continuing rotations of the holding member 22, the detection pattern shown in FIG. 6B where two-time detection per one rotation cycle appears repeatedly is obtained.

It is understood that by increasing the number of detection windows 231 of the shielding member 23, it becomes possible to increase counts of detection for one rotation cycle. It is also possible to change timing of detection of a radio signal within one rotation cycle by changing a positional relationship between the detection windows 231. In other words, by varying the number of detection windows and positions of detection windows, it becomes possible to provide a unique detection pattern for each replacement 21. It is also possible to configure the printer 1 to be able to identify the type of the replacement 21 by differentiating the detection patterns among the replacements as described above.

Hereafter, four examples (detection processes (1) to (4)) of a detection process for identifying the replacement 21 attached to the printer 1 are explained. The detection processes (1) to (4) are executed under control of the control unit 11 with the above described 1st to 4th examples of the configuration of the holding member 22 and the shielding member 23, respectively. In the following, an expression like "rotate the driving unit 151" means that one of the holding member 22 and the shielding member 23 provided to be rotatable is rotated by rotating the driving unit 151 so that the state of the non-contact type IC tag 31 is altered between the exposed state and the shielded state.

Detection Process (1)

Figure 7:
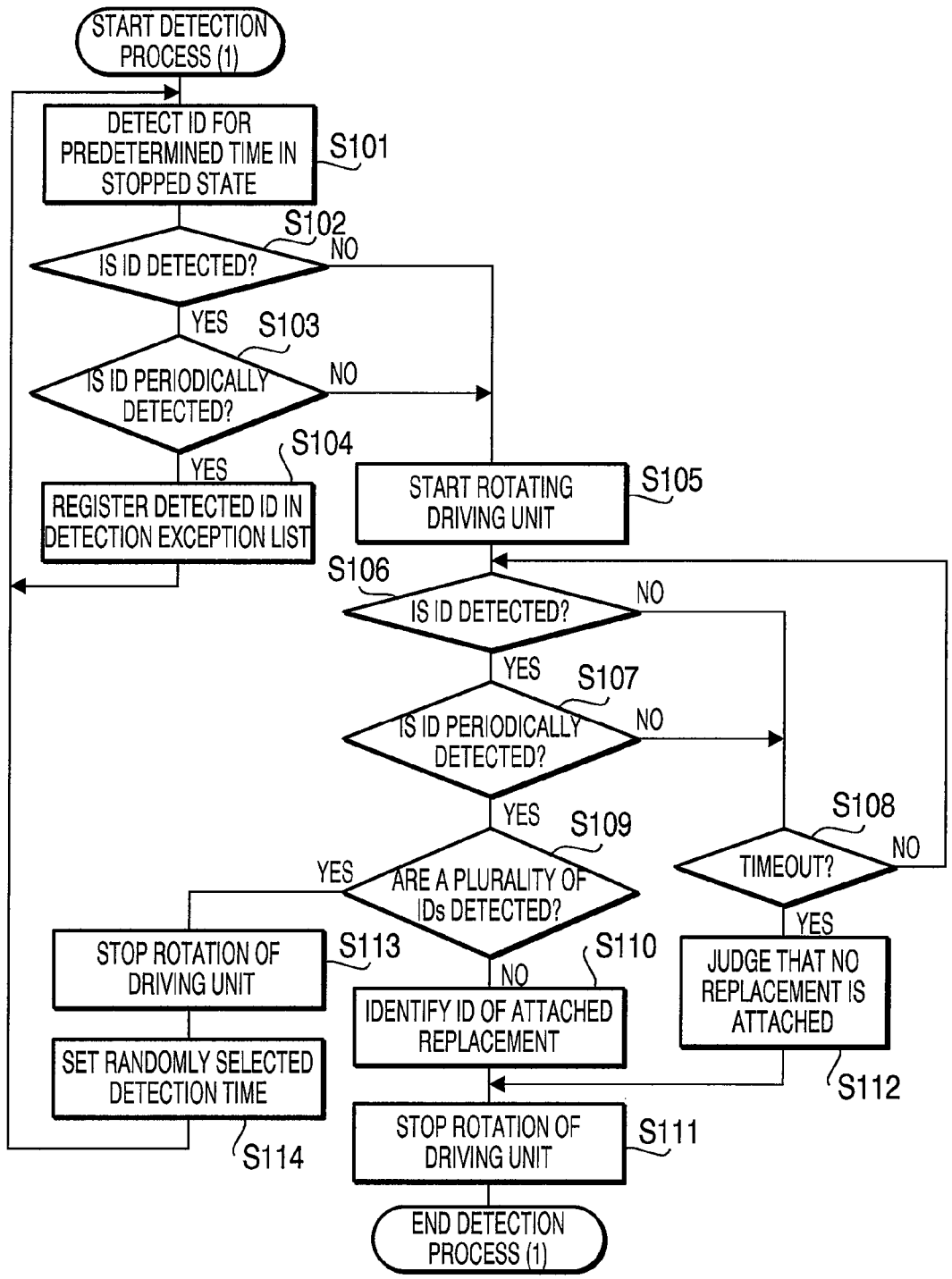
FIG. 7 is a flowchart illustrating a first example of a detection process to be executed by a control unit of the printer.

The detection process (1) shown in FIG. 7 is executed at predetermined timing when identification of the replacement 21 attached to the printer 1 is required. For example, the predetermined timing includes timing when the printer 1 is turned on, and timing when an opening or closing operation for a cover used to replace the replacement 21 attached to the printer 1 is detected.

First, the control unit 11 operates to detect identification of the non-contact type IC tag 31 through the wireless communication unit 16 for a predetermined time period in a state where the driving unit 151 is stopped (step S101). Detection of the identification of the non-contact type IC tag 31 is executed by continuously transmitting, from the wireless communication unit 16, a request signal for requesting a replay to non-contact type IC tags 31 existing within a communication range, and by receiving identification transmitted from the non-contact type IC tags existing within the communication range. It should be noted that the non-contact type IC tags within the communication range include the non-contact type IC tag 31 in the inside of the printer 1 and the non-contact type IC tag 31 in another printer.

In step S101, when an ID equal to one of IDs registered in a detection exception list is detected, such an ID is neglected. That is, even when such an ID in the detection exception list is detected, the control unit 11 judges that no ID is detected.

Next, in step S102, the control unit 11 judges whether an ID of the non-contact type IC tag 31 is detected based on a result of the detection for the predetermined time period in step S101. When the control unit 11 judges that an ID is detected (S102: YES), control proceeds to step S103 where the control unit 11 judges whether a detection pattern of the ID is a periodic pattern.

If the ID is periodically detected even when the driving unit 151 is stopped, it can be judged that an ID of the non-contact type IC tag 31, whose alternating state between the exposed state and the shielded state is being detected in another printer existing around the printer 1, is detected in the printer 1. Therefore, in this case (S103: YES), the control unit 11 judges that the replacement 21 corresponding to the periodically detected ID is not a replacement attached to the printer 1, and registers such an ID in the detection exception list (step S104). Then, control returns to step S101. The detection exception list is a list of IDs of replacements 21 which are regarded as not being attached to the printer 1. IDs registered in the detection exception list are treated as targets to be excepted from detection results by the wireless communication unit 16.

When the control unit 11 judges that no ID of the non-contact type IC tag 31 is detected (S102: NO), or the control unit 11 judges that the ID of the non-contact type IC tag 31 is not periodically detected but is detected continuously (S103: NO), control proceeds to step S105 where the control unit 11 outputs a signal for turning on the driving unit 151 to start rotation (step S105). By starting to rotate the driving unit 151, the state of the non-contact type IC tag 31 of the replacement 21 attached to the printer 1 starts to alter between the exposed state and the shielded state.

Then, the control unit 11 judges whether an ID of the non-contact type IC tag 31 being rotated by the driving unit 151 is detected (step S106). It should be noted that when an ID equal to an ID registered in the detection exception list is detected, the control unit 11 neglects such an ID registered in the detection exception list. On the other hand, when the control unit 11 judges that no ID of the non-contact type IC tag 31 is detected (S106: NO), the control unit 11 judges whether a predetermined time has elapsed (i.e., whether timeout occurs) (step S108). When the predetermined time has not elapsed (S108: NO), control returns to step S106.

When the control unit 11 judges that an ID of the non-contact type IC tag 31 is detected (S106: YES), control proceeds to step S107 where the control unit 11 judges whether a detection pattern of the ID is periodic.

When the control unit 11 judges that the detection patter is not periodic but is continuous (S107: NO), control proceeds to step S108 to make a judgment regarding a lapse of the timeout as described above.

When the ID is detected periodically in step S107 (S107: YES), control proceeds to step S109 where the control unit 11 judges whether IDs of a plurality of non-contact type IC tags 31 are detected periodically. More specifically, in step S109, when the printer 1 is configured such that a plurality of replacements 21 can be attached at the same time, the control unit 11 judges whether a plurality of IDs are detected, and further judges whether the detected plurality of IDs indicate the same type of replacement.

When a plurality of IDs are not detected or when all the detected plurality of IDs indicate different types of replacements, the judgment result in step S109 becomes "NO". On the other hand, when a plurality of IDs are detected and the detected IDs include IDs indicating the same type of replacement, the judgment result in step S109 becomes "YES".

If it is judged in step S109 that the control unit 11 detects a single ID periodically, but not the plurality of non-contact types IC tags (S109: NO), the control unit 11 judges that the detected ID is the ID of the replacement 21 attached to the printer 1 (step S110). Then, the control unit 11 outputs a signal for turning off to the driving unit 151 to stop the rotation of the driving unit 151 (step S111). Then, the detection process (1) terminates.

It should be noted that when the control unit 11 stops the driving unit 151, the control unit 11 controls the rotation angle of the motor so the non-contact type IC tag 31 of the replacement 21 is brought to the shielded state. As a result, a possibility, that the non-contact type IC tag 31 of the replacement 21 attached to the printer 1 is detected when the detection is made next in a state where the driving unit 151 is stopped, becomes low, and thereby it becomes easier to identify the replacement 21 not attached to the printer 1, with exception of the case where power of the printer 1 is accidentally cut off while the driving unit 151 is rotated.

On the other hand, when it is judged in step S108 that the timeout occurs in a state where no ID of the non-contact type IC tag 31 has been detected from the beginning of rotation of the driving unit 151 in step S105 (S106: NO) or when it is judged in step S108 that the occurs in a state where an ID is detected continuously (S107: NO), control proceeds to step S112. In step S112, the control unit 11 judges that no replacement 21 is connected to the printer 1. If an ID has been detected in step S112, the control unit 11 may register such an ID in the detection exception list. After step S112 is processed, the control unit 11 outputs a power off signal to the driving unit 151 to stop rotation of the driving unit 151 (step S111). Then, the detection process (1) terminates.

On the other hand, when the control unit 11 judges in step S109 that IDs of the plurality of non-contact type IC tags 31 are detected periodically while the driving unit 151 rotates (S109: YES), the control unit 11 outputs a power off signal to the driving unit 151 to stop rotation of the driving unit 151 (step S113). In this case, the control unit 11 controls the motor of the replacement 21 so that the non-contact type IC tag 31 of the replacement is brought to the shielded state.

Detecting periodically the IDs of the plurality of non-contact type IC tags 31 during rotation of the driving unit 151 means that the control unit 11 has detected not only the non-contact type IC tag 31 of the replacement 21 attached to the printer 1 but also the non-contact type IC tag provided in another printer in which the ID is detected while rotating the driving unit. Therefore, in this case, it is necessary to identify whether the detected ID is the ID of the replacement 21 attached to the printer 1 or the ID of the replacement attached to another printer.

For this reason, first, the control unit 11 stops the driving unit 151 of the printer 1 (i.e., its own driving unit 151) (step S113), and sets a randomly selected detection time (step S114). Then, control returns to step S101 to try to detect the ID of the non-contact type IC tag 31 during the detection time set in step S114 while stopping the driving unit 151. If the ID is periodically detected during the detection time (S103: YES), the control unit 11 judges that the replacement 21 corresponding to the detected ID is a replacement not attached to the printer 1, and in this case the control unit 11 registers the detected ID in the detection exception list (step S104). As a result, the wireless condition moves to a state where non-contact IC tags 31 of the replacements 21 attached to other printers are not detected. Therefore, it becomes possible to identify an ID of the replacement 21 attached to the printer 1 through steps S101 to S111.

If the control unit 11 were not able to periodically detect the non-contact type IC tag 31 within the detection time set in step S114 (S013: NO), it can be judged that rotation of the driving unit 151 of another printer has been stopped. Therefore, in this case, it becomes possible to identify the ID of the replacement 21 attached to the printer 1 through steps S101 to S111.

Detection Process (2)

Figure 8:
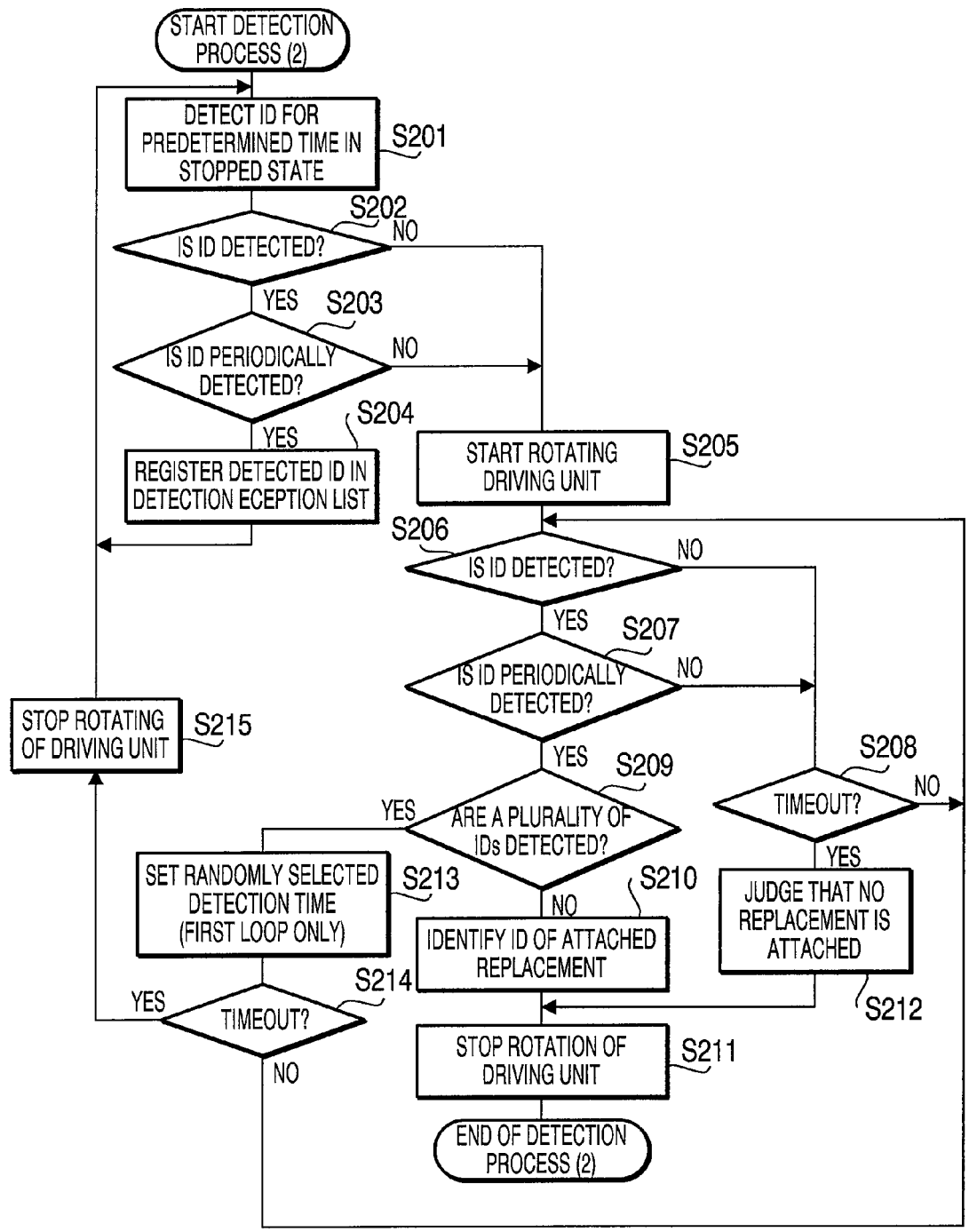
FIG. 8 is a flowchart illustrating a second example of a detection process to be executed by a control unit of the printer.

As in the case of the detection process (1), the detection process (2) shown in FIG. 8 is executed at predetermined timing when identification of the replacement 21 attached to the printer 1 is required. For example, the predetermined timing includes timing when the printer 1 is turned on, and timing when an opening or closing operation for a cover used to replace the replacement 21 attached to the printer 1 is detected. Since steps S201 to S212 of the detection process (2) are substantially the same as steps S101 to S112 of the detection process (1) shown in FIG. 7, explanations thereof will not be repeated. In the following, steps S213 to S215 after the affirmative judgment in step S209 will be explained.

When the control unit 11 judges in step S209 that IDs of the plurality of non-contact type IC tags 31 are detected during rotation of the driving unit 151 (S209: YES), the control unit 11 sets a randomly selected detection time (step S213). It should be noted that step S213 is executed only for the first loop process, and is skipped from the second and subsequent loop processes.

Detecting the IDs of the plurality of non-contact type IC tags 31 during rotation of the driving unit 151 means that the control unit 11 has detected not only the non-contact type IC tag 31 of the replacement 21 attached to the printer 1 but also the non-contact type IC tag provided in another printer in which the ID is detected while rotating the driving unit. Therefore, in this case, it is necessary to identify whether the detected ID is the ID of the replacement 21 attached to the printer 1 or the ID of the replacement attached to another printer.

For this reason, the control unit 11 sets a randomly selected detection time for continuing rotation of the driving unit 151 which is currently being rotated in the printer 1. Then, the control unit 11 judges whether the detection time has elapsed from the time of setting the detection time in step S213 (step S214). That is, the control unit 11 judges whether a timeout occurs.

If the timeout does not occur (S214: NO), control returns to step S206 to further judge whether an ID of the non-contact type IC tag 31 is detected during rotation of the driving unit 151.

That is, in this case, the control unit 11 continues to detect the ID of the non-contact type IC tag 31 while expecting that the driving unit 151 in another printer is stopped during rotation of the driving unit 151 of the printer 1, and thereby the wireless condition of the printer 1 moves to the state where the ID of the replacement in another printer is not detected. Therefore, in this case, after the control unit 11 judges that a single ID is periodically detected in step S209 (S209: NO), the control unit 11 becomes able to identify the ID of the replacement 21 attached to the printer 1 in step S210.

On the other hand, when the control unit 11 judges that the timeout occurs as a result of continuously detecting the plurality of IDs during rotation of the driving unit 151 in the printer 1 (S209: YES and S214: YES), the control unit 11 outputs a power off signal to the driving unit 151 to stop rotation of the driving unit 151 (step S215). In this case, the control unit 11 controls the rotation angle of the motor such that the non-contact type IC tag 31 is brought to the shielded state.

Then, control returns to step S201 where the control unit 11 tries to detect the ID of the non-contact type IC tag 31 for the predetermined detection time in a state where the driving unit 151 is stopped. When the non-contact type IC tag 31 is periodically detected in the predetermined detection time (S203: YES), the control unit 11 regards the detected ID as the ID of the replacement 21 not attached to the printer 1, and registers the detected ID in the detection exception list (step S204). As a result, the wireless condition moves to the state where the ID of the non-contact type IC tag 31 of the replacement 21 attached to another printer is not detected. Therefore, in this case, the control unit 11 becomes able to identify the ID of the replacement 21 attached to the printer 1 through steps S201 to S211.

Detection Process (3)

Figure 9:
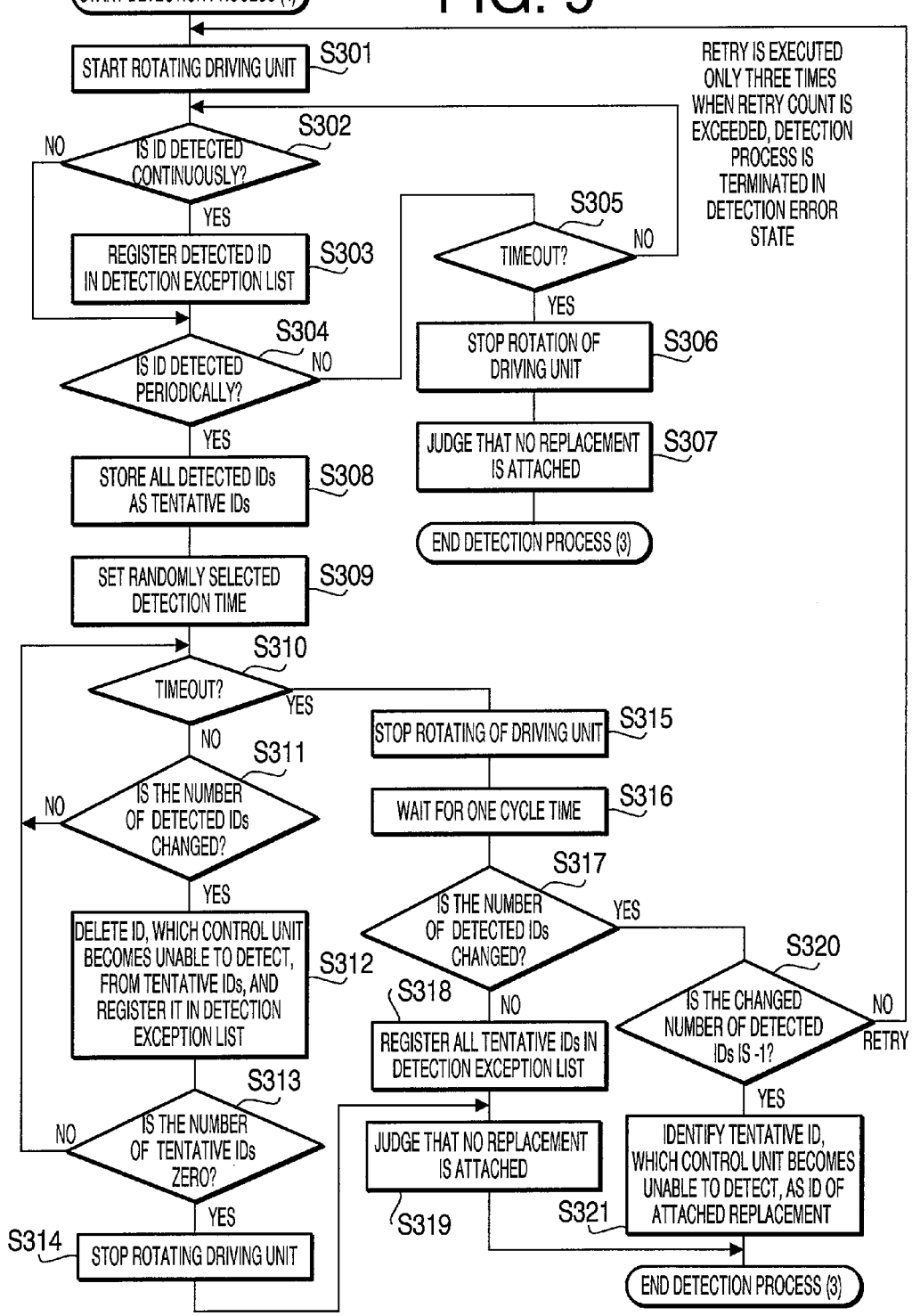
FIG. 9 is a flowchart illustrating a third example of a detection process to be executed by a control unit of the printer.

The detection process (3) shown in FIG. 9 is executed at predetermined timing when identification of the replacement 21 attached to the printer 1 is required. For example, the predetermined timing includes timing when the printer 1 is turned on, and timing when an opening or closing operation for a cover used to replace the replacement 21 attached to the printer 1 is detected.

First, the control unit 11 outputs a power-on signal for activating the driving unit 151 to start rotation of the driving unit 151 (step S301). By starting rotation of the driving unit 151, the state of the non-contact type IC tag 31 of the replacement 21 attached to the printer 1 alters between the exposed state and the shielded state. Then, the control unit 11 judges whether the ID of the non-contact type IC tag 31 is detected in a continuous detection pattern during rotation of the driving unit 151 (step S302). In this case, if an ID equal to an ID stored in the detection exception list is detected, the control unit 11 neglects such an ID. That is, when an ID equal to an ID stored in the detection exception list is detected, the control unit 11 judges that no ID is detected.

When the control unit 11 continuously detects the ID of the non-contact type IC tag 31 in step S302, the control unit 11 is not detecting the non-contact type IC tag 31 of the replacement 21 attached to the printer 1 but is detecting the non-contact type IC tag 31 of the replacement 21 which is attached to another printer and is in an stopped state. Therefore, in this case (S302: YES), the control unit 11 judges the detected ID to be an ID of the replacement 21 not attached to the printer 1, and registers the detected ID in the detection exception list (step S303). Then, control proceeds to step S304.

The detection exception list is a list of IDs of replacements 21 which are regarded as not being attached to the printer 1. IDs registered in the detection exception list are treated as targets to be excepted from detection results by the wireless communication unit 16.

On the other hand, when the control unit 11 judges that the ID of the non-contact type IC tag 31 is not detected in a continuous detection pattern (S302: NO), control returns to step S304.

In step S304, the control unit 11 judges whether the ID of the non-contact type IC tag 31 is detected in a periodical detection pattern. In this case, if an ID equal to an ID registered in the detection exception list is detected, the control unit 11 neglects such an ID.

When the control unit 11 judges in step S304 that no ID of the non-contact type IC tag 31 is detected (S304: NO), the control unit 11 judges whether a predetermined time has elapsed from the beginning of rotation of the control unit 151 (i.e., whether a timeout occurs) (step S305).

If the predetermined time has not elapsed (S305: NO), control returns to step S302. On the other hand, if the control unit 11 judges that the predetermined time has elapsed from the beginning of rotation of the driving unit 151 in the state where the ID of the non-contact type IC tag 31 is not detected in a periodic pattern (S304: NO and S305: YES), the control unit 11 stops rotation of the control unit 151 (step S306). Then, the control unit 11 judges that no replacement 21 is attached to the printer 1 (step S307). Then, the detection process (3) terminates.

On the other hand, when the control unit 11 judges that the ID of the non-contact type IC tag 31 is detected in a periodic pattern during rotation of the driving unit 151 (S304: YES), the control unit 11 stores all the periodically detected IDs as tentative IDs (step S308).

Detecting periodically the ID of the non-contact type IC tag 31 during rotation of the during unit 151 means that there are possibilities including a possibility that the non-contact type IC tag 31 of the replacement 21 attached to the printer 1 is detected and a possibility that the non-contact type IC tag 31 of the replacement 21 attached to another printer in which the ID is being detected while rotating the driving unit is detected. Furthermore, there is a possibility that the control unit 11 detects the non-contact type IC tag 31 of the replacement 21 attached to the printer 1 and the non-contact type IC tag 31 of the replacement attached to another printer. Therefore, in this case, it is required to identify whether the periodically detected ID is an ID of the replacement 21 attached to the printer 1 or an ID of the replacement 21 attached to another printer.

For this reason, in step S309, the control unit 11 sets a randomly selected detection time for continuing rotation of the driving unit 151 which is currently being rotated. The detection time may be generated based on random numbers or may be defined as a value unique to a product based on a serial number of the product. Next, the control unit 11 judges whether the detection time has elapsed from the time when the randomly selected detection time is set (step S310). That is, the control unit 11 judges whether a timeout occurs.

When the control unit 11 judges that the timeout does not occur (S310: NO), control proceeds to step S311 where the control unit 11 judges whether the number of periodically detected IDs changes from the time when the tentative IDs have been stored. When the number of periodically detected IDs does not change (S311: NO), control returns to step S310. On the other hand, when the control unit 11 judges that the number of periodically detected IDs changes (S311: YES), the control unit 11 removes the ID, which the control unit 11 become unable to detect, from the list of the tentative IDs, and further registers the ID (removed from the list of the tentative IDs) in the detection exception list (step S312). As a result, the wireless condition is brought to the state where the control unit 11 does not detect the non-contact type IC tag 31 of the replacement attached to another printer.

That is, in this case, the control unit 11 continues to detect the ID of the non-contact type IC tag 31 while expecting that the driving unit 151 in another printer is stopped during rotation of the driving unit 151 of the printer 1, and thereby the wireless condition of the printer 1 moves to the state where the ID of the replacement in another printer is not detected. It should be noted that the control unit 11 sets a randomly selected detection time so as to intentionally shift the timing of stopping rotation of the driving unit 151 with respect to another printer.

In step S313, the control unit 11 judges whether the number of tentative IDs is zero. When the number of tentative IDs is not zero (S313: NO), control returns to step S310. When the number of tentative IDs is zero (S313: YES), the control unit 11 controls the driving unit 151 to stop rotation (step S314). Then, the control unit 11 judges that no replacement 21 is attached to the printer 1 (step S319). Then, the detection process (3) terminates.

On the other hand, when the control unit 11 judges that the timeout occurs within the detection time during repeated execution of steps S310 to S313 (S310: YES), the control unit 11 stops rotation of the driving unit 151 (step S315). Then, the control unit 11 waits for a waiting time corresponding to one cycle of rotation of the rotating holding member 22 or the rotating shielding member 23 (step S316).

After the waiting time has elapsed, the control unit 11 judges whether the number of IDs which are detected at the timing of stopping rotation of the driving unit 151 has changed (step S317). In this case, when the ID of which detection pattern has changed from the periodic pattern (which is detected at the timing of stopping rotation of the driving unit 151) to the continuous pattern, the control unit 11 counts such a detection pattern change as the change of the number of IDs in step S317.

When the control unit 11 judges that the number of periodically detected IDs has not changed (S317: NO), the control unit 11 stores all of the stored tentative IDs in the detection exception list (step S318). Then, the control unit 11 judges that no replacement 21 is attached to the printer 1 (step S319). Then, the detection process (3) terminates.

On the other hand, when the control unit 11 judges that the number of periodically detected IDs has changed (S317: YES), the control unit 11 judges whether the changed number is minus one (i.e., whether the number of periodically detected IDs have decreased by one) (step S320). When the control unit 11 judges that the changed number is not minus one (S320: NO), control returns to step S301 to retry the detection process. The retry is executed, for example, three times, and if it is judged that the changed number is not minus one after the third retry, the control unit 11 judges that a detection error occurs, and the detection process (3) terminates.

On the other hand, when the control unit 11 judges that the changed number is minus one (S320: YES), the control unit 11 judges the only one ID, which the control unit 11 becomes unable to detect, to be an ID of the replacement 21 attached to the printer 1 (step S321). Then, the detection process (3) terminates.

Detection Process (4)

Figure 10:
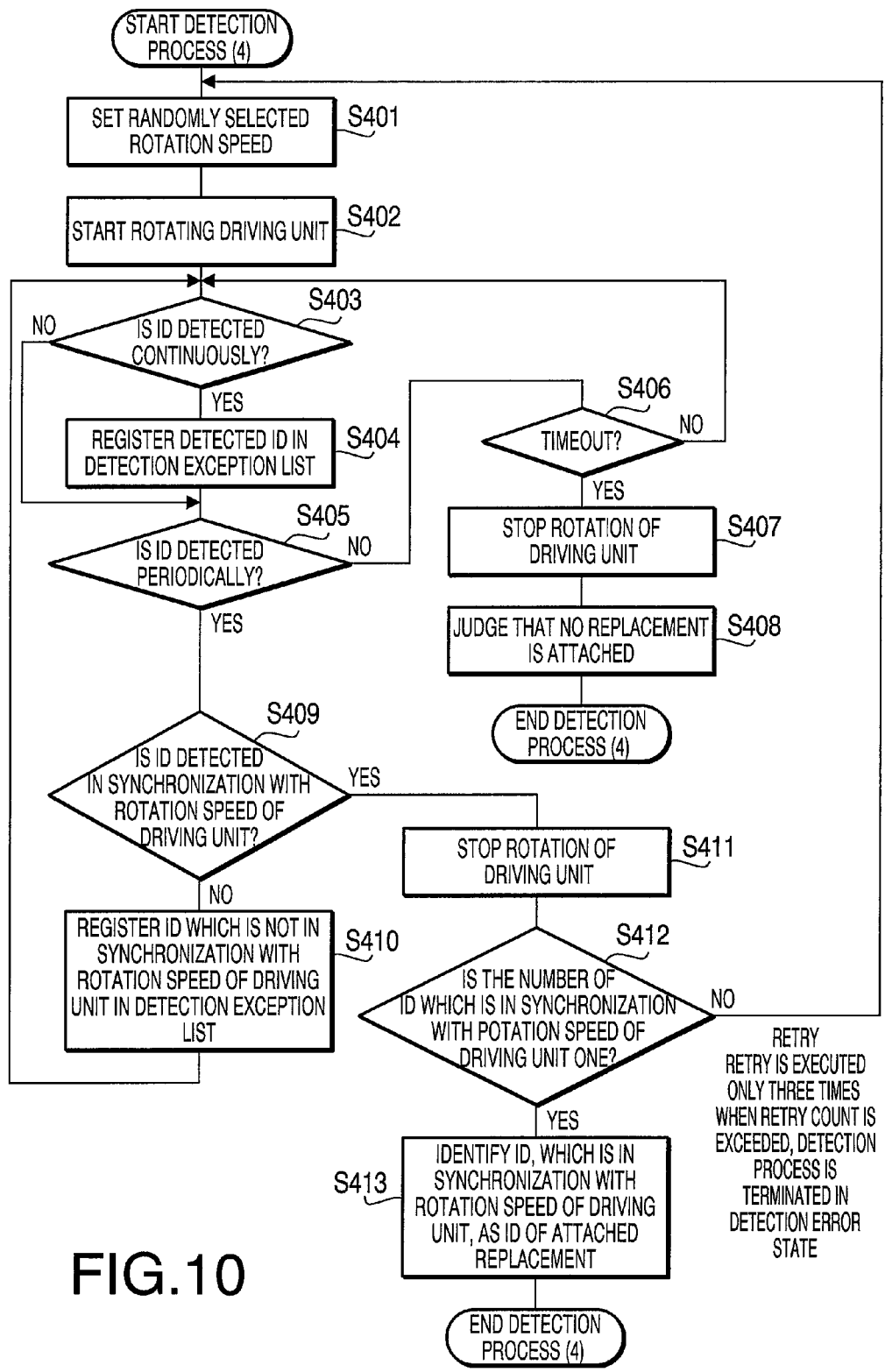
FIG. 10 is a flowchart illustrating a fourth example of a detection process to be executed by a control unit of the printer.

The detection process (4) shown in FIG. 10 is executed at predetermined timing when identification of the replacement 21 attached to the printer 1 is required. For example, the predetermined timing includes timing when the printer 1 is turned on, and timing when an opening or closing operation for a cover used to replace the replacement 21 attached to the printer 1 is detected.

First, the control unit 11 sets a randomly selected value as a rotation speed of the rotatable holding member 22 or the rotatable shielding member 23 to be rotated by the driving unit 151 (step S401). In this case, the randomly selected rotation speed may be determined based on random numbers or may be determined as a value unique to a product based on a serial number of the product. Then, the control unit 11 outputs a power-on signal for turning on the driving unit 151 to start rotation of the driving unit 151 so that the driving unit 151 rotates at the randomly selected rotation speed set in step S401 (step S402).

By starting rotation of the driving unit 151, the state of the non-contact IC tag 31 of the replacement 21 attached to the printer 1 alters between the exposed state and the shielded state. Next, the control unit 11 judges whether an ID of the non-contact type IC tag 31 is detected as a continuous detection pattern during rotation of the driving unit 151 (step S403). In this case, when an ID equal to one of IDs registered in the detection exception list is detected, such an ID is neglected. That is, even when such an ID in the detection exception list is detected, the control unit 11 judges that no ID is detected.

If it is judged in step S403 that the ID of the non-contact type IC tag 31 is detected continuously, it can be judged that the control unit 11 does not detect the non-contact type IC tag 31 of the replacement 21 attached to the printer 1, but detects the non-contact type IC tag 31 of the replacement 21 which lies around the printer 1 and is in a stopped state. Therefore, in this case, the control unit 11 judges the continuously detected ID to be an ID of the replacement which is not attached to the printer 1, and registers the detected ID in the detection exception list (step S404). Then, the control proceeds to step S405. The detection exception list is a list of IDs of replacements 21 which are regarded as not being attached to the printer 1. IDs registered in the detection exception list are treated as targets to be excepted from detection results by the wireless communication unit 16. When the control unit 11 judges that the ID of the non-contact type IC tag 31 is not detected in the continuous detection pattern (S403: NO), control proceeds to step S405.

In step S405, the control unit 11 judges whether the ID of the non-contact type IC tag 31 is detected in a periodic pattern. In this case, when an ID equal to an ID stored in the detection exception list is detected, the control unit 11 neglects such an ID. When the control unit 11 judges that the ID of the non-contact type IC tag 31 is not detected (S405: NO), control proceeds to step S406 where the control unit 11 judges whether a predetermined time has elapsed from the beginning of rotation of the driving unit 151 (step S406). That is, the control unit 11 judges whether a timeout occurs (step S406).

If the timeout does not occur (S406: NO), control returns to step S403. On the other hand, if the predetermined time has elapsed from the beginning of rotation of the driving unit 151 in the state where the periodic detection pattern of the non-contact type IC tag 31 is not detected (S405: NO and S406: YES), the control unit 11 stops rotation of the driving unit 151 (step S407). Then, the control unit 11 judges that no replacement 21 is attached to the printer 1 (step S408). Then, the detection process (4) terminates.

On the other hand, when the control unit 11 judges that the periodic detection pattern of the ID of the non-contact type IC tag 31 is detected during rotation of the driving unit 151, control proceeds to step S409.

Detecting periodically the ID of the non-contact type IC tag 31 during rotation of the during unit 151 means that there are possibilities including a possibility that the non-contact type IC tag 31 of the replacement 21 attached to the printer 1 is detected and a possibility that the non-contact type IC tag 31 of the replacement 21 attached to another printer in which the ID is being detected while rotating the driving unit is detected. Furthermore, there is a possibility that the control unit 11 detects the non-contact type IC tag 31 of the replacement 21 attached to the printer 1 and the non-contact type IC tag 31 of the replacement attached to another printer. Therefore, in this case, it is required to identify whether the periodically detected ID is an ID of the replacement 21 attached to the printer 1 or an ID of the replacement 21 attached to another printer.

For this reason, in step S409, the control unit 11 judges whether a detection cycle of the ID which is periodically detected is in synchronization with the rotation speed of the driving unit 151 (i.e., the randomly selected rotation speed set in step S401) (step S409). That is, the control unit 11 judges whether the ID of the non-contact type IC tag 31 is detected in a cycle in synchronization with a cycle of rotation of the rotatable holding member 22 or the rotatable shielding member 23 which is rotated by the driving unit 151.

When the control unit 11 judges that the ID of the non-contact type IC tag 31 is detected in the detection cycle which is not in synchronization with the rotation speed of the driving unit 151 (S409: NO), the control unit 11 registers such an ID of which detection cycle is not in synchronization with the rotation speed of the driving unit 151, in the detection exception list (step S410). As a result, the wireless condition of the printer 1 is brought to the state where the non-contact type ID tag 31 of the replacement 21 attached to another printer is not detected. In other words, when the detection cycle of the ID of the non-contact type I tag 31 is not in synchronization with the randomly selected rotation speed, it can be judged that such an ID is an ID of the replacement attached to another printer in which the driving unit 151 is rotated at a different speed (which is different from the randomly selected rotation speed of the driving unit 151 in the printer 1). It should be understood that the control unit 11 sets a randomly selected rotation speed so as to intentionally shift the rotation speed of the driving unit 151 with respect to the rotation speed of the driving unit rotated in another printer.

On the other hand, when the control unit 11 judges that the ID of the non-contact type IC tag 31 is detected in the detection cycle which is in synchronization with the rotation speed of the driving unit 151 (S409: YES), the control unit 11 stops rotation of the driving unit 151 (step S411). Then, the control unit 11 judges whether the number of IDs whose detection cycle is in synchronization with the rotation speed of the driving unit 151 is one (step S412).

When the number of IDs whose detection cycle is in synchronization with the rotation speed of the driving unit 151 is larger than one (i.e., a plurality of IDs whose detection cycle is in synchronization with the rotation speed of the driving unit 151 are detected) (S412: NO), control returns to step S401 to retry the detection process. The retry is executed, for example, three times, and if it is judged that a plurality of IDs whose detection cycle is in synchronization with the rotation speed of the driving unit 151, the control unit 11 judges that a detection error occurs, and the detection process (4) terminates.

On the other hand, if the control unit 11 judges that the number of IDs whose detection cycle are in synchronization with the rotation speed of the driving unit 151 is one (S412: YES), control proceeds to step S413 where the control unit 11 judges that the detected ID is an ID of the replacement 21 attached to the printer 1. Then, the detection process (4) terminates.

Figure 11A:
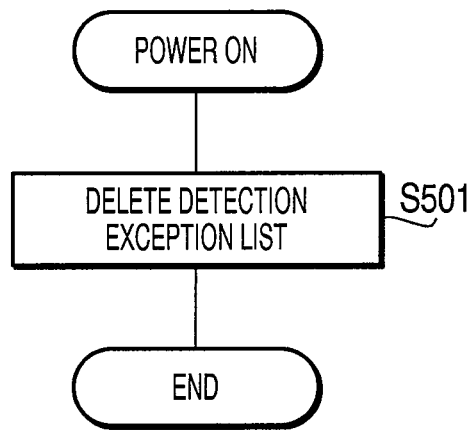
FIGS. 11A and 11B are flowcharts as examples of a deletion process for deleting a detection exception list.

Hereafter, a deletion process for deleting the detection exception list stored in the above described detection processes (1) to (4) is explained with reference to FIGS. 11A and 11B.

As described above, the non-contact type IC tags 31 corresponding to the IDs registered in the detection exception list are excepted from detection results by the wireless communication unit 16. Therefore, if the ID of the replacement 21 to be newly connected to the printer 1 has not been removed from the detection exception list, the printer 1 is not able to detect the replacement 21 when the replacement 21 is attached to the printer 1.

For this reason, the control unit 11 deletes the contents of the detection exception list when a predetermined condition where there is a possibility that a certain replacement 21 is attached to the printer 1 is satisfied. More specifically, as shown in FIG. 11A, the control unit 11 deletes the contents of the detection exception list when power of the printer 1 is tuned from OFF to ON (step S501). With this configuration, it becomes possible to detect the replacement 21 when the replacement 21 is attached to the printer 1 during the power off state of the printer 1.

Figure 11B:
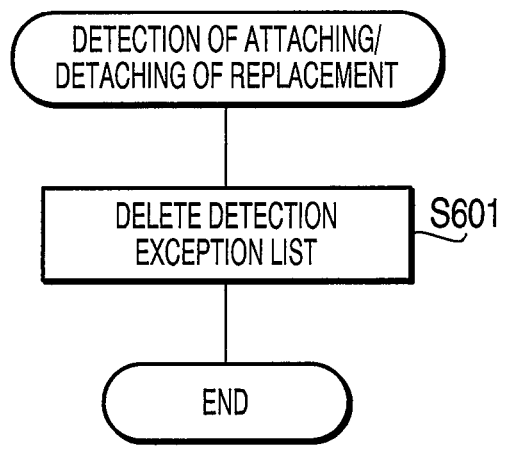

As shown in FIG. 11B, the contents of the detection exception list may be deleted when attaching or detaching of the replacement 21 is detected (step S601).

Hereafter, advantages of the above described embodiment will be described.

(a) As described above, the printer 1 operates to change the state of the non-contact type IC tag 31 of the replacement 21 between the exposed state and the shielded state, and judges the replacement 21 having the non-contact type IC tag 31, which has been periodically detected in synchronization with the control by the control unit 11, to be an attachment attached to the printer 1. With this configuration, it becomes possible to securely distinguish the replacement 21 attached to the printer 1 from the replacement placed around the printer 1 or the replacement 21 attached to another printer installed around the printer 1. In this case, by periodically detecting the non-contact type IC tag 31 during the ON state of the motor of the control unit 151, it becomes possible to securely identify the replacement 21 attached to the printer 1. According to the embodiment, a structure where a non-contact type IC tag attached to a holding member of a replacement is mechanically or electrically connected to the printer 1 is not adopted. Such a configuration is able to eliminate the concern of contacting failure between the replacement 21 and the printer 1.

(b) Since the rotation structure such as a roller provided in the replacement 21 is utilized as the rotating holding member 22 or the rotating shielding member 23, there is no need for providing a dedicated structure for rotating the non-contact type IC tag 31. Such a configuration is advantageous in regard to manufacturing cost and downsizing. Furthermore, in the printer 1, the driving unit 151 provided for driving the rotation structure (i.e., the roller) is used also as a driving unit for driving the rotating holding member or the rotating shielding member. That is, a dedicated driving unit for driving the rotating holding member or the rotating shielding member is not required. Such a configuration is advantages in regard to the manufacturing cost and downsizing.

(c) Detecting periodically the non-contact type IC tag 31 regardless of the fact that the driving unit 151 in the printer 1 is not rotated means that the printer 1 has detected the non-contact type IC tag in another printer in which the driving unit is rotated while the state of the non-contact IC tag 31 is altered between the exposed state and the shielded state. Therefore, the printer 1 is able to identify that such an non-contact type IC tag 31 detected periodically in such a situation is the non-contact type IC tag of the replacement 21 not attached to the printer 1.

(d) By registering the ID of the non-contact type IC tag 31 periodically detected in the state where the driving unit 151 is not detected, and by removing the non-contact type IC tag 21 corresponding to the ID registered in the detection exception list, it becomes possible to distinguish easily the non-contact type IC tag 31 of the replacement 21 attached to the printer 1 from the replacement 21 attached to another printer.

(e) When the non-contact type IC tag 31 is not periodically detected in the state where the driving unit 151 is not rotated, the printer 1 operates to detect the non-contact type IC tag 31 after starting rotation of the driving unit 151. That is, the situation where the non-contact type IC tag 31 is not periodically detected in the state where the driving unit 151 is not rotated corresponds to the case where no non-contact type IC tag 31 of the replacement 21 is detected or the case where at least one of the non-contact type IC tag 31 of the replacement 21 attached to the printer 1 and the non-contact type IC tag 31 of the replacement 21 existing around the printer 1 is detected. By detecting the non-contact type IC tag 31 by starting rotation of the driving unit 151 from such a situation, it becomes possible to securely identify the replacement 21 attached to the printer 1.

(f) Detecting periodically each of a plurality of non-contact type IC tags 31 during rotation of the driving unit 151 means that the printer 1 simultaneously detects the non-contact type IC tag 31 of the replacement 21 attached to the printer 1 and the non-contact type IC tag 31 provided in another printer in which the state of the non-contact type IC tag 31 is altered between the exposed state and the shielded state. Therefore, in such a situation, the printer 1 operates to detect the non-contact type IC tag 31 after stopping once the rotation of the driving unit 151, and when the non-contact type IC tag 31 is periodically detected, the printer 1 judges that the replacement 21 corresponding to the detected non-contact type IC tag 31 to be a replacement attached to the printer 1.

(g) When each of the plurality of non-contact type IC tags 31 is detected in the state where the driving unit 151 is rotated, it is possible to intentionally shift the operation timing of the printer 1 from the operation timing of another printer by setting a randomly selected detection time and then executing the detection while stopping the rotation of the driving unit 151 for the detection time.

(h) When each of the plurality of non-contact type IC tags 31 is detected in the state where the driving unit 151 is rotated, it is possible to intentionally shift the operation timing of the printer 1 from the operation timing of another printer by setting a randomly selected detection time and then continuously executing the detection while keeping the rotation of the driving unit 151 for the detection time.

(i) When the non-contact type IC tag 31 is periodically detected in the state where the driving unit 151 is rotated, it is possible to intentionally shift the stop timing of the driving unit 151 of the printer 1 from the stop timing of the driving unit of another printer installed near to the printer 1 by setting a randomly selected value for the rotation time of the driving unit 151. Furthermore, by judging the ID of the non-contact type IC tag 31 whose wireless condition moves to the state of being not detected, to be the replacement 21 attached to the printer 1, it becomes possible to identify the replacement 21 among a plurality of printers.

(j) The printer 1 is configured to detect the ID at a unique cycle corresponding to the rotation speed of the driving unit 151 set as a randomly selected value by the printer 1. With this configuration, even when a plurality of IDs of the non-contact type IC tags 31 are simultaneously detected or even when the detection is performed in the state where the driving units of two printers are rotated in the situation where the replacement 21 is attached to only one of the two printers, it is possible to securely identify the replacement 21 attached to the printer 1.

(k) When the control unit 11 stops the rotation of the driving unit 151, the control unit 11 operates such that the non-contact type IC tag 31 is in the shielded state. With this configuration, it becomes possible to decrease the possibility that, at the next execution of detection, the control unit 11 detects the non-contact type IC tag 31 of the replacement 21 attached to the printer 1 in the state where the driving unit 151 is not rotated. Therefore, it becomes possible to easily identify the non-contact type IC tag 31 of the replacement 21 not connected to the printer 1.

(l) When the printer 1 is turned ON or when a predetermined operation concerning attaching or detaching of the replacement 21 is detected, the printer 1 deletes the contents of the detection exception list. Therefore, when the replacement 21 which was registered in the detection exception list and has already been removed from the detection exception list is newly attached to the printer 1, the printer 1 becomes able to judge such a replacement 21 to be a replacement attached to the printer 1.

Although the present invention has been described in considerable detail with reference to certain preferred embodiments thereof, other embodiments are possible.

In the above described embodiment, the state of the non-contact type IC tag is altered between the exposed state and the shielded state by rotating one of the holding member and the shielding member of the replacement. However, various types of motion of members can be adopted to alter the state of the non-contact type IC tag between the exposed state and the shielded state.

For example, by reciprocating or opening or closing a shielding member (e.g., a shutter type shielding member) to cover or expose the non-contact IC tag, it is possible to alter the state of the non-contact type IC tag between the exposed state and the shielded state.

Alternatively, by reciprocating the holding member holding the non-contact type IC tag relative to the shielding member, the state of the non-contact type IC tag may be altered between the exposed state and the shielded state.

In the above described embodiment, the periodic detection pattern is utilized for detection of the non-contact type IC tag. However, various types of detection patterns based on an intermittent basis may be adopted for detection of the non-contact type IC tag. For example, a random detection pattern may be employed.

In the above described embodiment, the rotation structure (e.g., a roller) of the replacement is utilized to rotate one of the holding member and the shielding member of the replacement. However, if the replacement does not have such a rotation structure, the replacement may be provided with a dedicated structure for detecting the non-contact type IC tag. In this case, the printer 1 may have a dedicated driving unit for detection of the non-contact type IC tag.

The above described detection processes (1) to (4) may be applied to a printer provided with a sensor for detecting presence/absence of the replacement. In this case, it becomes possible to further securely detect the replacement attached to the printer 1 by using the detection result of the sensor for detecting presence/absence of the replacement as well as the detection processes (1) to (4).

In each of the detection processes (3) and (4), before the detection of IDs of the non-contact type IC tags 31 may be performed by starting rotation of the driving unit 151, the printer 1 may perform the detection while stopping the driving unit and register the periodically detected ID in the detection exception list. More specifically, before step S301 (see FIG. 9) of the detection process (3) or before step S401 of the detection process (4), the control unit 11 may execute steps corresponding to S101 to S104 (see FIG. 7) of the detection process (1). With this configuration, it becomes possible to decrease the possibility that the printer 1 periodically detect he ID of the non-contact type IC tag 31 of the replacement 21 attached to another printer during the detection for the non-contact type IC tag 31 while rotating the driving unit 151 of the printer 1.

What is claimed is:

1. An image forming device comprising:
a recordation unit to which a replacement is detachably attachable, the replacement comprising:
a non-contact type IC tag that stores data concerning the replacement and is able to transmit the data through a radio signal;
a holding member that holds the non-contact type IC tag; and
a shielding member formed to alter a state of the non-contact type IC tag between an exposed state where the non-contact type IC tag is exposed to a detection unit of the image forming device and the detection unit is able to detect the non-contact type IC tag, and a shielded state where the non-contact type IC tag is shielded from the detection unit and the detection unit is not able to detect the non-contact type IC tag alternately, by changing relatively a positional relationship with the holding member,
the image forming device further comprising:
the detection unit configured to detect the non-contact type IC tag by receiving the radio signal transmitted from the non-contact type IC tag;
a driving unit configured to drive the holding member to change the state of the non-contact type IC tag in a state where the replacement has been attached to the image forming device, between the exposed state and the shielded state alternately; and
a controller configured to identify the non-contact type IC tag detected by the detection unit as that provided in the replacement being attached to the image forming device in response to the non-contact type IC tag of the replacement which has been attached to the image forming device being intermittently detected by the detection unit while the driving unit is activated,
wherein, in the replacement,
the holding member is a rotatable member configured to be rotatable about a rotation axis and to hold the non-contact type IC tag on a circumferential surface side with respect to a position of the rotation axis; and
the shielding member is fixed in the replacement such that the state of the non-contact type IC tag rotating in accordance with rotation of the holding member alters between the exposed state and the shielded state, wherein, in the image forming device, the driving unit is configured to rotate the holding member of the replacement attached to the image forming device.

2. An image forming device comprising:
a recordation unit to which a replacement is detachably attachable, the replacement comprising:
  a non-contact type IC tag that stores data concerning the replacement and is able to transmit the data through a radio signal;
  a holding member that holds the non-contact type IC tag; and
  a shielding member formed to alter a state of the non-contact type IC tag between an exposed state where the non-contact type IC tag is exposed to a detection unit of the image forming device and the detection unit is able to detect the non-contact type IC tag, and a shielded state where the non-contact type IC tag is shielded from the detection unit and the detection unit is not able to detect the non-contact type IC tag alternately, by changing relatively a positional relationship with the holding member,
the image forming device further comprising:
  the detection unit configured to detect the non-contact type IC tag by receiving the radio signal transmitted from the non-contact type IC tag;
  a driving unit configured to drive the shielding member to change the state of the non-contact type IC tag in a state where the replacement has been attached to the image forming device, between the exposed state and the shielded state alternately; and
  a controller configured to identify the non-contact type IC tag detected by the detection unit as that provided in the replacement being attached to the image forming device in response to the non-contact type IC tag of the replacement which has been attached to the image forming device being intermittently detected by the detection unit while the driving unit is activated,
wherein, in the replacement,
  the holding member is fixed; and
  the shielding member is a rotatable member configured to be rotatable about a rotation axis, and is configured to alter the state of the non-contact type IC tag between the exposed state and the shielded state by rotating relative to the holding member,
wherein, in the image forming device, the driving unit is configured to rotate the shielding member of the replacement attached to the image forming device.

3. The image forming device according to claim 1, wherein the controller is configured to identify the non-contact type IC tag detected intermittently by the detection unit while the driving unit is not activated as that of the replacement not attached to the image forming device.

4. The image forming device according to claim 1, wherein the controller is configured to store data received from the non-contact type IC tag which is intermittently detected by the detection unit while the driving unit is not activated, as an exception target, and except the exception target from a detection result of the detection unit.

5. The image forming device according to claim 1, wherein in response to a fact that the non-contact type IC tag is not intermittently detected in a state where the driving unit is not activated, the controller is configured to activate the driving unit to detect the non-contact type IC tag through the detection unit.

6. The image forming device according to claim 1, wherein the controller is configured to:
  control activation of the driving unit by outputting a signal for on/off control of a motor provided in the driving unit; and
  identify the non-contact type IC tag as that of the replacement attached to the image forming device in response to a fact that the non-contact type IC tag is detected while an on-signal for activating the driving unit is outputted to the driving unit.

7. The image forming device according to claim 1, wherein in response to a fact that a plurality of non-contact type IC tags are intermittently detected, respectively, through the detection unit while the driving unit is activated, the controller is configured to:
  stop the driving unit and detect the non-contact type IC tag through the detection unit; and
  identify the non-contact type IC tag detected by the detection unit as that of the replacement not attached to the image forming device in response to a fact that the non-contact type IC tag is intermittently detected while the driving unit is stopped.

8. The image forming device according to claim 7, wherein in response to a fact that a plurality of non-contact type IC tags are intermittently detected, respectively, through the detection unit while the driving unit is activated, the controller is configured to:
  set a randomly selected time;
  stop the driving unit for the randomly selected time and detect the non-contact type IC tag through the detection unit; and
  detect the non-contact type IC tag while activating the driving unit after a lapse of the randomly selected time.

9. The image forming device according to claim 7, wherein in response to a fact that a plurality of non-contact type IC tags are intermittently detected, respectively, through the detection unit while the driving unit is activated, the controller is configured to:
  set a randomly selected time;
  continue activation of the driving unit for the randomly selected time and detect the non-contact type IC tag through the detection unit; and
  detect the non-contact type IC tag while stopping the driving unit after a lapse of the randomly selected time.

10. The image forming device according to claim 1, wherein in response to a fact that at least one non-contact type IC tag is intermittently detected through the detection unit while the driving unit is activated, the controller is configured to:
  set a randomly selected time;
  stop the driving unit after the randomly selected time has elapsed while the driving unit is activated; and
  identify the non-contact type IC tag which the controller has become unable to intermittently detect through the detection unit in a state where the driving unit is stopped, as that of the replacement attached to the image forming device.

11. The image forming device according to claim 1, wherein the controller operates to:
  set a randomly selected value as a driving speed of the driving unit; and
  identify the non-contact type IC tag detected through the detection unit as that of the replacement attached to the image forming device, in response to a fact that the non-contact type IC tag is detected through the detection unit in a cycle which is in synchronization with the driving speed of the driving unit in a state where the driving unit is activated in the driving speed.

12. The image forming device according to claim 6, wherein the controller is configured to stop the driving unit such that the non-contact type IC tag is in the shielded state.

13. The image forming device according to claim 4, wherein the controller is configured to delete the exception target when one of a power-on operation and a power-off operation of the image forming device is conducted or when a certain operation for attaching or detaching of the replacement is conducted.

14. The image forming device according to claim 1, wherein:
the holding member of the replacement has a cylindrical body and holds the non-contact type IC tag, on a surface of the cylindrical body, at a position shifted toward a circumferential surface side of the cylindrical body with respect to a position of a rotation axis of the holding member; and
the shielding member of the replacement has a cylindrical shape formed to be larger than an outer diameter of the cylindrical body of the holding member, and is configured to surround a circumferential surface of the cylindrical body of the holding member and to have at least one opened part.

15. A replacement comprising:
a non-contact type IC tag that stores data concerning the replacement and is able to transmit the data through a radio signal;
a holding member that holds the non-contact type IC tag; and
a shielding member formed to alter a state of the non-contact type IC tag between an exposed state where the non-contact type IC tag is exposed to a detection unit of an image forming device and the detection unit is able to detect the non-contact type IC tag, and a shielded state where the non-contact type IC tag is shielded from the detection unit and the detection unit is not able to detect the non-contact type IC tag alternately, by changing relatively a positional relationship with the holding member in a state where the replacement has been attached to the image forming device,
wherein
the holding member is a rotatable member configured to be rotatable about a rotation axis and to hold the non-contact type IC tag on a circumferential surface side with respect to a position of the rotation axis; and
the shielding member is fixed in the replacement such that the state of the non-contact type IC tag rotating in accordance with rotation of the holding member alters between the exposed state and the shielded state.

16. The replacement according to claim 15, wherein:
the holding member of the replacement has a cylindrical body and holds the non-contact type IC tag, on a surface of the cylindrical body, at a position shifted toward a circumferential surface side of the cylindrical body with respect to a position of a rotation axis of the holding member; and
the shielding member of the replacement has a cylindrical shape formed to be larger than an outer diameter of the cylindrical body of the holding member, and is configured to surround a circumferential surface of the cylindrical body of the holding member and to have at least one opened part.

* * * * *